April 21, 1959 C. W. HUCH ET AL 2,882,689
DRY WALL OF BRICKS
Filed Dec. 18, 1953 2 Sheets-Sheet 1

INVENTOR.
CARL W. HUCH AND
CARL W. HUCH, JR.
BY *William D. Carothers*
THEIR ATTORNEY April 21, 1959  C. W. HUCH ET AL  2,882,689
DRY WALL OF BRICKS
Filed Dec. 18, 1953  2 Sheets-Sheet 2

INVENTOR.
CARL W. HUCH AND
CARL W. HUCH, JR.
BY
THEIR ATTORNEY

United States Patent Office 2,882,689
Patented Apr. 21, 1959

2,882,689

DRY WALL OF BRICKS

Carl W. Huch and Carl W. Huch, Jr., McCandless Township, Allegheny County, Pa.

Application December 18, 1953, Serial No. 398,976

1 Claim. (Cl. 61—35)

This invention relates generally to block structures for masonry work and more particularly to a fabricated block structure for use in dry wall masonry.

In preparing stone for dry wall masonry, it is necessary to accurately select the kind of stone as to texture, form and cleavage characteristics. The texture of the stone determines its workability. A stone having a high percentage of silica distributed therethrough is difficult to work as it deflects the tools rather than spalling off where desired. Again the cleavage planes of some stone are a source of destruction of the stone after being quarried and exposed to the elements. The water seeps into the cleavages and the frost expands and breaks up the stone.

The cost of the stone and the cost of preparing the stone makes it prohibitive for many uses. The proper stone to employ is at a premium and it is time consuming to dress the stone before it is usable. After it is dressed and is placed in a masonry structure such as a retaining wall, a slip or slide in the embankment will of course take out the wall. This is due usually to the escape or misdirection or alteration of undersurface water. If the water gets in back of the wall and has difficulty in escaping through the wall, a hydraulic pressure builds up along the back surface of the wall and shoves the whole of the wall outwardly causing it to lose its batter and eventually fall. This hydraulic pressure is against the whole of the back wall face which is ordinarily a flat surface like the front. The stone prepared for dry wall work generally averages approximately eight inches deep. Some stones may be of greater dimension but since they are hewn they cannot be very large without requiring machine handling which is very costly.

The principal object of this invention is the provision of a fabricated block or brick that may be of uniform thickness or height and has a rear projection that is pointed or rounded providing rear faces that are angular relative to the front face or the plane of the wall. These angularly positioned faces present a pressure reacting surface that permits only a component part of the forces thereon to effect or disturb the plane of the face of the wall. These pressure reaction faces being angular to the wall face receive and deflect the forces against the rear face of the wall and divert water and any loose granules or sediment into the voids formed between the pointed pressure reacting faces. This channeling of the water to the open or dry joint between adjacent blocks permits it to escape and release the pressure.

These rearwardly projecting pressure reacting faces are staggered because the vertical joints between the blocks of subjacent courses are staggered as in any masonry structure.

Thus the voids formed between rearwardly projecting pressure faces provide checker board patterns on the rear face of the wall and the projecting points of each block tie that block into the back wall vertically as well as horizontally. The back wall is usually of slag, broken stone, or chipped stone. This tie forms a structural integration between the wall, its back wall, and still allows free drainage. The back wall is in turn integrated into the irregular formation of the ground retained. A flat stone wall cannot have its individual stones integrated into the back wall in this manner to lock the masonry structure vertically as well as horizontally and distribute pressure.

The blocks comprising this invention are preferably formed with a parallel top and bottom surface, but in constructing the block, it is desirable to mold it on a flat surface which results in a smooth flat bottom. The top is struck to produce an undulated or rough surface with a myriad of peaks. When the block is layed the roughened top surface is kept on top and permits the wall to weep or flow drainage through this horizontal joint as well as the vertical joints. However, the sides of the blocks may be rough or smooth.

The voids in back of the wall formed by the pointed rear faces of blocks in the same course are also covered at their top and bottom by the pointed rear portions of the blocks above and below this joint. Thus each vertical joint is the apex of a pyramid or the opposite of a pointed pressure reactive face. Since the blocks are of different sizes and shapes these voids are different in shape which produces a nonuniformity in the tie between the wall and its back wall. The fact that the blocks are of different sizes produces a better wall architecturally than where all of the blocks are of the same size. But a greater advantage is obtained when the pointed tie backs of the larger blocks interlock to a greater depth than the other blocks having shorter tie backs. The smaller blocks in combination with each other and with the larger blocks provide a deeper void for receiving silt without loss of the back wall tying feature of each block.

Each flat wall block has a rectangular face that is to be exposed as the masonry structure. This face may be sculptured, pointed, molded or glazed to simulate stone or other building material or left plain and smooth. The most popular is a molded face simulating stone. The molded face can be colored or otherwise treated to give the effect of different types of stone. However, with the plastics now available, very accurate and realistic faces can be formed on these blocks and at some distance away it is difficult if not impossible to determine whether it is or is not a stone wall.

Other objects and advantages appear hereinafter in the following description and claims.

The accompanying drawings show for the purpose of exemplification without limiting the invention or claims thereto, certain practical embodiments illustrating the principles of this invention wherein:

Figure 1:
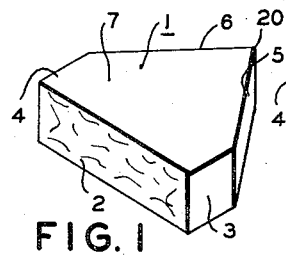
Figs. 1, 2 and 3 are perspective views of building blocks comprising this invention and which vary in size relative to each other.
Figure 2:
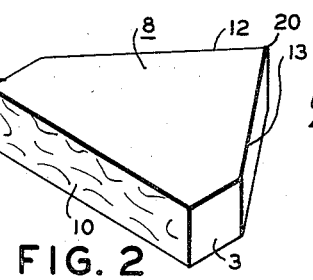
Figure 3:
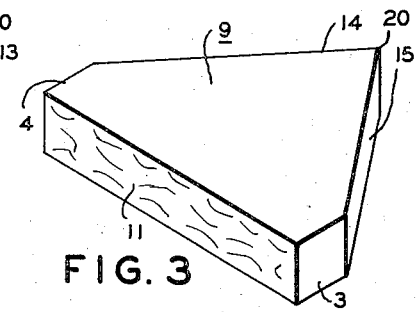

Referring to the drawings, particularly to the blocks shown in Figs. 1, 2 and 3, it will be noted that they are substantially the same only being different in size. For example: the block 1 of Fig. 1 comprises the front face 2 and is provided with parallel ends 3 and 4 which terminate in diagonal faces 5 and 6 which form the sides of a triangle. 7 is the top of the block. The blocks 8 in Fig. 2 and the block 9 in Fig. 3 have the same structural faces, however, they differ in dimension only. It should be noted that each of the blocks 1, 8 and 9 is the same relative thickness, and the end walls 3 and 4 are the same dimension. However, the face 2 of the block 1 is twelve inches long whereas the face 10 of the block 8 is sixteen inches long, and the face 11 of the block 9 is twenty inches long. Owing to the fact that the blocks 8 and 9 are longer than the block 1, although they are not any thicker, the narrowly projecting faces of block 8 as indicated at 12 and 13 are obviously longer and the same is true with the diagonally projecting faces 14 and 15 of the block 9. A construction line drawn from the apices of each of the blocks and at right angles to their front face, measures ten inches in the block 1, twelve inches in block 8, and fourteen inches in block 9. These blocks are sometimes made in halves which would be substantially half of that of each of the blocks 1, 8 and 9 as shown.

Figure 4:
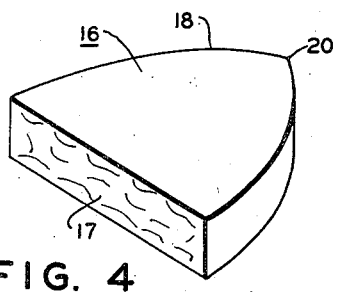
Fig. 4 is a perspective view of a modified form of a building block.

As shown in Fig. 4 the block 16 is the same thickness and may be of equal length as either of the blocks 1, 8 and 9, however, in place of having two parallel ends four inches deep as shown in each of the blocks 1, 8 and 9, this device is provided with the rearwardly projecting faces 18 and 19 which are curved instead of flat and this type of block does not require the flat parallel end such as indicated at 3 and 4 in each of the other block structures. The curvatures of the faces 18 and 19 are such that a greater curvature may be supplied adjacent the front face 17. The side faces are continuous from the ends of the front face and the rearwardly projecting faces 18 and 19 are continuous from the ends of the front face 17 to the apex 20.

Figure 5:
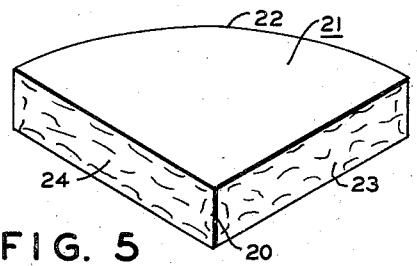
Fig. 5 is a perspective view of a building block comprising this invention and having an arcuate face.

Referring to Fig. 5, block 21 is formed as a 90° section having an arcuate face 22, and lateral flat sides or faces 23 and 24 which are radii of the arc 22. Here again the height of the block is the same as that illustrated in each of the foregoing structures. A block of this character may be used in producing curves in walls or a right angle corner with the faces 23 and 24 forming the opposite sides of the corner.

Figure 6:
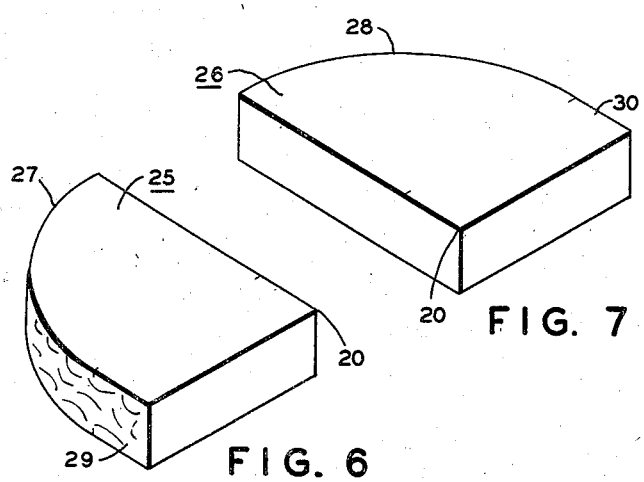
Figs. 6 and 7 are perspective views of right and left hand building blocks comprising this invention and having an arcuate face extending into a straight flat face.
Figure 7:
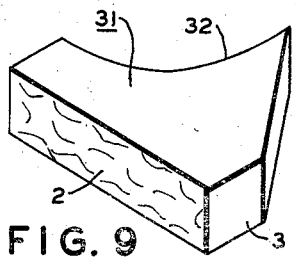

A modification in this type of block structure is illustrated in Figs. 6 and 7 wherein the blocks 25 and 26 have an arcuate exposed surface 27 and 28 which terminate in a straight face 29 and 30. Thus the blocks 25 and 26 are similar to the structure of the block built in Fig. 5 with the exception that they have an added section of approximately four inches and the arcuate section has substantially a twelve inch radius. These blocks are shown applied in the right angle corner of a wall wherein blocks 25 and 26 are alternated, as the corner is built up. Thus the pressure faces forming the apex 20 are offset in every course.

Figure 9:
Fig. 9 is a perspective view of a modified form of block having a concave arcuate cutout.

The block structure as shown at 31 in Fig. 9 is similar to that of the block 1 of Fig. 1. However, one of the rearwardly projecting sides is employed with a concave surface 32 which is a cutout and which may be used to circumvent the obstructions that are found in constructing a wall closely adjacent a house which has gutters or a fence or other things of that character. The wall must be capable of circumventing these objects. The block structure as shown in Fig. 9 of course may be used upside down to provide right or left hand structure.

Figure 10:
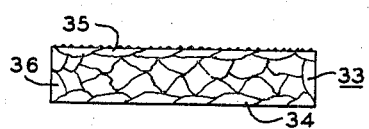
Fig. 10 is a view in side elevation of the blocks comprising this invention.

The block structure 33 as shown in Fig. 10 is illustrative of any one of the block members 1, 8, 9, 16, 21, 25, 26 and 31 and is provided with a smooth bottom 34 and a roughened or undulated surface 35 on the top. The face 36 of the block is the exposed face and is molded to simulate precisely the face of a hewn stone.

Figure 11:
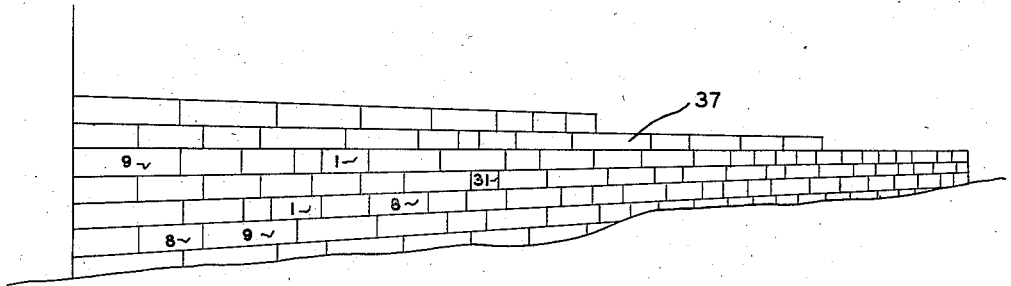
Fig. 11 is a front elevation of the masonry structure constructed of blocks comprising this invention.

In assembling the blocks in the wall, as illustrated in Figure 11, it is preferable to put the smooth face down and allow the undulated or roughened face to be up so as to permit water to drain across through the horizontal division between subjacent layers or courses of blocks. The undulations engaging the smooth undersurface of the blocks thereabove prevent this joint from being sealed against the weepage of moisture. As shown in Fig. 11 the blocks forming the wall 37 are of different dimensions and are so laid that the blocks depict a wall selected of stone at random and they provide the appearance of a real stone wall.

It is preferable not to build this wall as a wet wall particularly when employed to shore a bank as the same would prevent the free drainage of the surface waters or springs from the bank. If, however, the block structures are to be employed in the masonry structure that must be sealed, then the blocks should be cemented together in a manner similar to that of any other form of cemented masonry structure.

Figure 8:
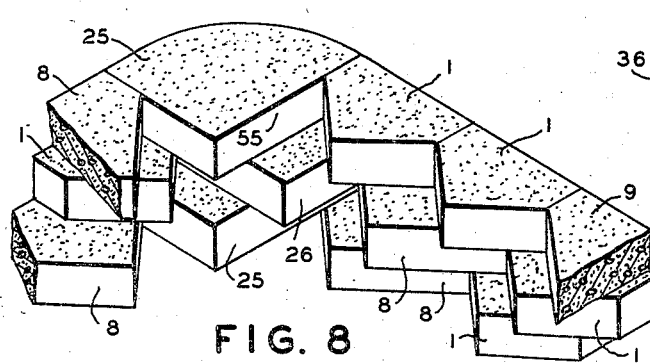
Fig. 8 is a plane view illustrating the application of the block structures as shown in Figs. 6 and 7.
Figure 12:
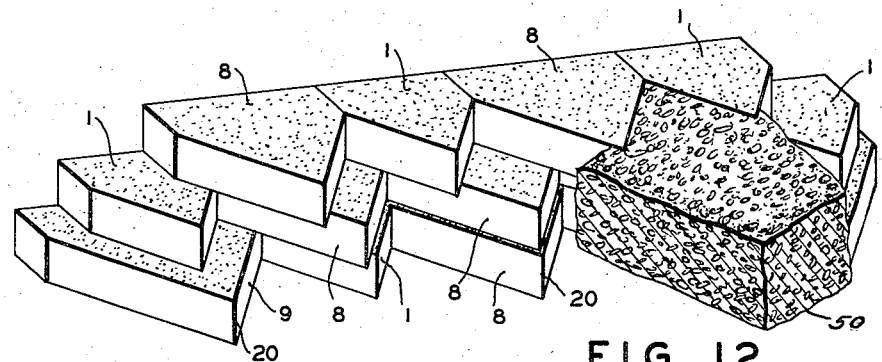
Fig. 12 is an elevation of the rear face of the wall structure constructed of block comprising this invention showing a portion of the granular backfill in the voids.

Referring particularly to Fig. 8 and 12 it will be noted that the apices 20 of the blocks provide a myriad of projections laterally and vertically of the wall. Each of these projections also define an adjacent void. The voids and the projections in turn readily interlock and blend themselves into the rear wall and if the rear wall is made of broken stone or any other suitable material 50 such as gravel or slag, the projections interlock themselves both vertically and horizontally into this rear wall. This interlock increases the strength of the whole of the wall. Any water that collects behind the wall will seep into these voids of the wall and through to the face of the wall and run down the same. Any pressure exerted by the water in these voids will be conducted at an angle to the front face of the wall which in turn prevents the wall from giving away under a tremendous hydraulic force that occurs behind the flat wall made of regular brick or stone and having a face, the front and rear of which are the same and are plain.

Figure 13:
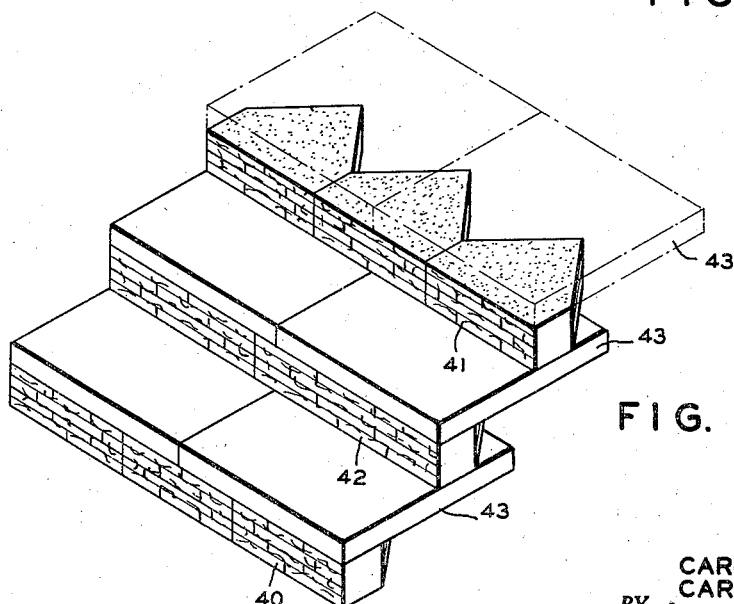
Fig. 13 is a perspective view of a block having a plurality of masonry faces formed on the face thereof for use in masonry structure and as step risers.

In Fig. 13 the blocks 40, 41, and 42 vary in size relative to each other. They are step risers and their front faces are made to appear to be constructed of three layers of thin stone. The tread 43 of each step extends over the surface of the lower risers and forms an added foundation for the next riser block.

It is understood that the phraseology employed herein is for the purpose of description and not of limitation and it is not intended to limit the invention claimed herein beyond the requirements of the prior art.

We claim:

A dry wall comprising a series of bricks laid in courses with each brick having substantially parallel top and bottom faces and a front face and end faces extending rearwardly from the ends of the front face and merging to define a rearwardly pointed projection with laterally facing pressure reacting faces angular to the front face, a myriad of outwardly projecting peaks covering one of said parallel faces of each brick for seizing the surface of the bricks forming the next adjacent course to produce resistance to movement and to provide drainage therebetween, adjacent end faces of said bricks in a single course forming vertical joints between adjacent bricks, each vertical joint is positioned over a top face portion of the next subjacent brick and the pointed rearward projections are offset relative to each other in adjacent courses to produce a pattern of staggered voids on the rear side of the wall with each void terminating in a vertical joint to drain the same, and a granular backfill occupying the pattern of the voids to lock the wall vertically as well as horizontally.

(References on following page)

References Cited in the file of this patent

UNITED STATES PATENTS

| | | |
|---|---|---|
| 272,883 | Ingalls | Feb. 27, 1883 |
| 379,429 | Werth | Mar. 13, 1888 |
| 868,411 | Cilek | Oct. 15, 1907 |
| 952,374 | Spitznagel | Mar. 15, 1910 |
| 952,918 | Mann | Mar. 22, 1910 |
| 1,058,674 | Kertes | Apr. 8, 1913 |
| 1,688,902 | Straight | Oct. 23, 1928 |
| 2,060,361 | Yama Moto | Nov. 10, 1936 |
| 2,192,691 | Mutch | Mar. 5, 1940 |
| 2,795,542 | Horne et al. | June 11, 1957 |

FOREIGN PATENTS

| | | |
|---|---|---|
| 8,138 | Switzerland | of 1894 |
| 5,575 | Great Britain | of 1897 |
| 179,836 | Germany | of 1907 |
| 61,078 | Sweden | of 1926 |
| 694,421 | France | of 1930 |
| 958,774 | France | of 1949 |

OTHER REFERENCES

Engineering News; vol. 72, No. 24; page 1169, December 10, 1914.